US011293388B1

(12) United States Patent
Massengill

(10) Patent No.: US 11,293,388 B1
(45) Date of Patent: Apr. 5, 2022

(54) VALVED SNORKEL SYSTEM AND METHOD OF MAKING AND USING THE SAME

(71) Applicant: Dustin Laurence Massengill, Greenville, NC (US)

(72) Inventor: Dustin Laurence Massengill, Greenville, NC (US)

( * ) Notice: Subject to any disclaimer, the term of this patent is extended or adjusted under 35 U.S.C. 154(b) by 0 days.

(21) Appl. No.: 17/386,797

(22) Filed: Jul. 28, 2021

(51) Int. Cl.
*B60K 13/02* (2006.01)
*F02M 35/16* (2006.01)
*F02M 35/10* (2006.01)

(52) U.S. Cl.
CPC .......... *F02M 35/162* (2013.01); *B60K 13/02* (2013.01); *F02M 35/10013* (2013.01); *F02M 35/10104* (2013.01); *F02M 35/10255* (2013.01); *F02M 35/10373* (2013.01)

(58) Field of Classification Search
CPC .......... F02M 35/162; F02M 35/10013; F02M 35/10104; F02M 35/10255; F02M 35/10373; B70K 13/02
See application file for complete search history.

(56) References Cited

U.S. PATENT DOCUMENTS

| | | | | |
|---|---|---|---|---|
| 5,195,484 A | * | 3/1993 | Knapp | F02M 35/10013 180/68.3 |
| 6,564,768 B2 | * | 5/2003 | Bauer | F02M 35/024 55/385.3 |
| 7,455,042 B2 | * | 11/2008 | Jacobi-Hinderer | F02M 35/10013 123/184.21 |
| 2013/0019833 A1 | * | 1/2013 | Li | F02D 41/18 123/184.56 |

* cited by examiner

*Primary Examiner* — Bryan A Evans
(74) *Attorney, Agent, or Firm* — Ashley D. Johnson; Dogwood Patent and Trademark Law

(57) ABSTRACT

The presently disclosed subject matter is generally directed to a system and method of protecting the engines of ATVs by preventing excessive water from entering the belt drive and/or air intake of the vehicle motor. The system includes a riser and valve assembly. Each snorkel valve assembly includes one or more water sensors in communication with a valve. When water is detected by the sensors, the valve closes, preventing water from entering the vehicle engine, transmission, air box, clutch housing, and/or any other vented element of the ATV engine. Instead, the water is diverted out of the system through a drain valve. Accordingly, the system prevents water, mud, and the like from entering the main components of the ATV motor.

18 Claims, 11 Drawing Sheets

VALVED SNORKEL SYSTEM AND METHOD OF MAKING AND USING THE SAME

TECHNICAL FIELD

The presently disclosed subject matter is generally directed to a snorkel system for use with a wide variety of all-terrain vehicles, and to methods of making and using the disclosed system.

BACKGROUND

ATVs (All Terrain Vehicles) have consistently increased in popularity over the past several years due at least in part to their ability to be effectively used in many different environments. For example, these vehicles are frequently used in marshes, swamps, streams, rivers, and the like. However, ATVs commonly intake water into the motor and/or exhaust when used in wet environments, which negatively affects performance and requires expensive repairs. Specifically, water can be drawn into the motor, clutch housing, air intake, and/or transmission causing serious damage or inoperability. Several million dollars are spent annually in the United States repairing ATVs that have ingested water and/or mud. Accordingly, many attempts have been made in an effort to prevent excessive motor contact with water. For example, external motor covers with elongated air intakes have been provided (typically referred to as "snorkel systems"). However, these covers only protect the vehicle up to a predetermined point of depth in the water. If the water is deeper that the predetermined level, water and/or mud are easily drawn into the motor, resulting in engine damage. It would therefore be beneficial to provide a system and method for addressing these and other shortcomings of the prior art.

SUMMARY

In some embodiments, the presently disclosed subject matter is directed to a snorkel system for use with a vehicle. Specifically, the system comprises a coupling defined by a main body comprising a first end and a second end with an interior channel therebetween. The coupling also includes a housing comprising a first end, a second end with an interior channel therebetween, wherein the first end of the housing is in fluid connection with the second end of the main body. The interior channel of the main body comprises a valve defined by an inlet, an outlet, and a drain, where in the valve is switchable between the first position in which the inlet is selectively in fluid communication with the outlet and a second position in which the inlet is selectively in fluid communication with a drain. The interior channel of the housing comprises one or more water sensors and one or more solenoid assemblies in fluid communication with each other. The solenoid assembly drives the valve to switch between the first position in the second position in response to the presence of water within the interior channel of the main body, as detected by the water sensors.

In some embodiments, the snorkel system further comprises a riser. The riser is defined by a first end, a second end, and a neck positioned between the first and second ends. The riser also includes an interior channel that runs the length of the riser. The riser includes a joint position at the second end of the riser, wherein the joint comprises a first end and a second end, the first joined in in fluid communication with the second end of the riser and the second joint in configured to be in fluid communication with the first end of the coupling main body when the riser is installed on the coupling.

In some embodiments the snorkel system further comprises a closure, filter, or both positioned at the first end of the riser.

In some embodiments, the vehicle is an all-terrain vehicle.

In some embodiments, each water sensor is positioned within an aperture within the interior channel of the housing.

In some embodiments, the main body comprises a length and width that are greater than a length and width of the housing.

In some embodiments, the system further comprises a control unit that allows the valve to be reset to the first position.

In some embodiments, the valve is an umbrella valve.

In some embodiments the valve is configured to switch to the second position when no water is detected by the water sensors.

In some embodiments, the system further comprises a collar valve configured as a drain.

In some embodiments, the presently disclosed subject matter is directed to a method of diverting water through a snorkel system. Specifically, the method comprises positioning a valve of a snorkel system in a first position wherein the system comprises a main body defined by first end and a second end with an interior channel therebetween. The snorkel system further includes a housing comprising a first end and a second end with an interior channel therebetween, wherein the first end of the housing is in fluid connection with the second end of the main body. The interior channel of the main body comprises a valve defined by an inlet, an outlet, and a drain, wherein the valve is switchable between a first position in which the inlet is selectively in fluid communication with the outlet and a second position in which the inlet is selectively in fluid communication with the drain. The interior channel of the housing comprises one or more water sensors and one or more solenoid assemblies in fluid communication with each other. The solenoid assembly drives the valve to switch between the first position and the second position in response to the presence of water within the interior channel of the main body as detected by the water sensors. The method includes receiving water within the interior channel of the main body, whereby the water activates the one or more water sensors, triggering the solenoid assembly to move the valve to the second position. The method also includes channeling the water from the coupling, thereby diverting the water from the system through a drain.

In some embodiments, the second end of the housing is operably connected to a motor vehicle, vehicle exhaust, or both.

DETAILED DESCRIPTION

Figure 1A:
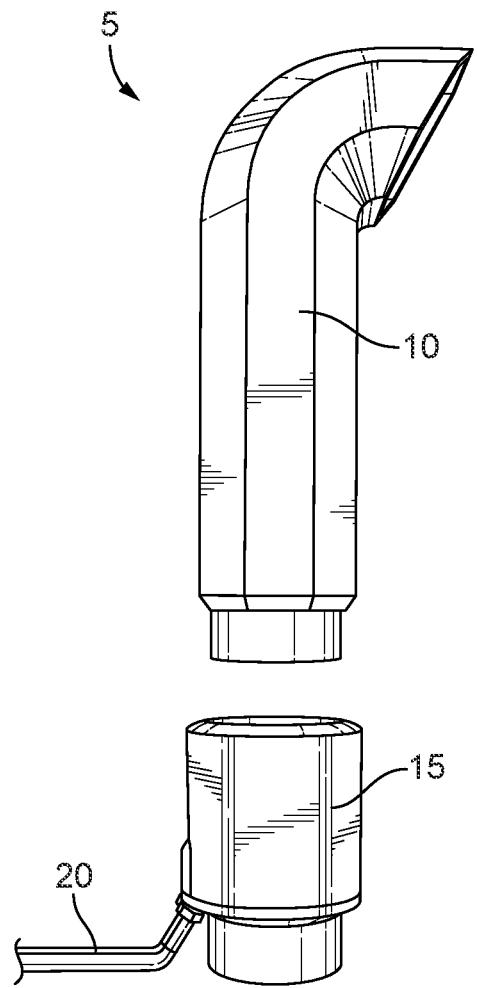
FIG. 1a is a side plan view of a snorkel system in accordance with some embodiments of the presently disclosed subject matter.

The presently disclosed subject matter is introduced with sufficient details to provide an understanding of one or more particular embodiments of broader inventive subject matters. The descriptions expound upon and exemplify features of those embodiments without limiting the inventive subject matters to the explicitly described embodiments and features. Considerations in view of these descriptions will likely give rise to additional and similar embodiments and features without departing from the scope of the presently disclosed subject matter.

Unless defined otherwise, all technical and scientific terms used herein have the same meaning as commonly understood to one of ordinary skill in the art to which the presently disclosed subject matter pertains. Although any methods, devices, and materials similar or equivalent to those described herein can be used in the practice or testing of the presently disclosed subject matter, representative methods, devices, and materials are now described.

Following long-standing patent law convention, the terms "a", "an", and "the" refer to "one or more" when used in the subject specification, including the claims. Thus, for example, reference to "a device" can include a plurality of such devices, and so forth. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise indicated, all numbers expressing quantities of components, conditions, and so forth used in the specification and claims are to be understood as being modified in all instances by the term "about". Accordingly, unless indicated to the contrary, the numerical parameters set forth in the instant specification and attached claims are approximations that can vary depending upon the desired properties sought to be obtained by the presently disclosed subject matter.

As used herein, the term "about", when referring to a value or to an amount of mass, weight, time, volume, concentration, and/or percentage can encompass variations of, in some embodiments +/−20%, in some embodiments +/−10%, in some embodiments +/−5%, in some embodiments +/−1%, in some embodiments +/−0.5%, and in some embodiments +/−0.1%, from the specified amount, as such variations are appropriate in the disclosed packages and methods.

As used herein, the term "and/or" includes any and all combinations of one or more of the associated listed items.

Relative terms such as "below" or "above" or "upper" or "lower" or "horizontal" or "vertical" may be used herein to describe a relationship of one element, layer, or region to another element, layer, or region as illustrated in the drawing figures. It will be understood that these terms and those discussed above are intended to encompass different orientations of the device in addition to the orientation depicted in the drawing figures.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Figure 1B:
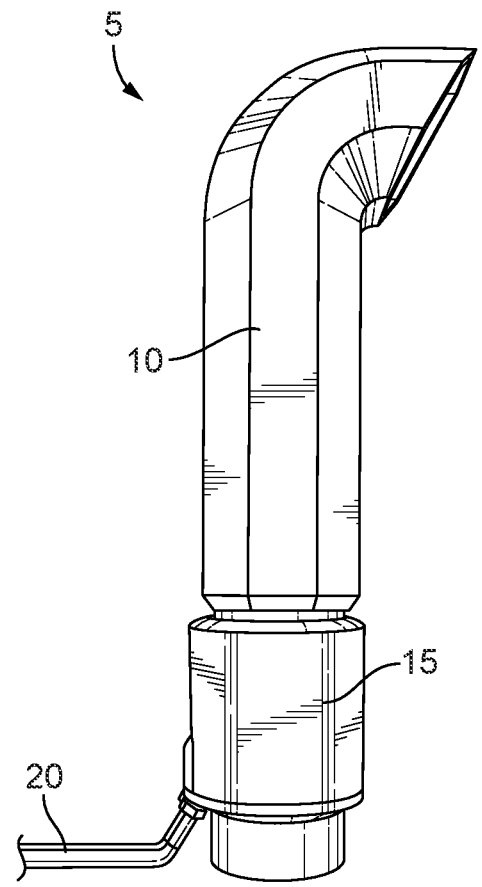
FIG. 1b is a side plan view of an assembled snorkel system in accordance with some embodiments of the presently disclosed subject matter.

The presently disclosed subject matter is generally directed to a system and method of protecting the engines of ATVs by preventing excessive water from entering the belt drive and/or air intake of the vehicle motor. The term "ATV" as used herein refers to any of a wide variety of vehicles suitable for use in varying terrains, such as four wheelers, side-by-sides, Humvees®, Jeeps®, and the like. FIGS. 1a and 1b illustrate one embodiment of snorkel system 5 comprising riser 10 and valve assembly 15. The term "snorkel" as used herein refers to a conduit that provides a pathway for air and/or water from the outside environment to a housing. As described in more detail below, each valve assembly includes one or more water sensors in communication with a valve. When water is detected by the sensors, the valve closes, preventing any water (e.g., salt water, fresh water, muddy water, etc.) from entering the vehicle engine, transmission, air box, clutch housing, and/or any other vented element of the ATV engine. Instead, the water is diverted out of the system through a manual or automatic drain. Accordingly, system 5 prevents water, mud, and the like from entering the main components of the ATV motor. Without system 5 in place, water can enter the ATV motor, causing severe and costly damage.

Figure 2A:
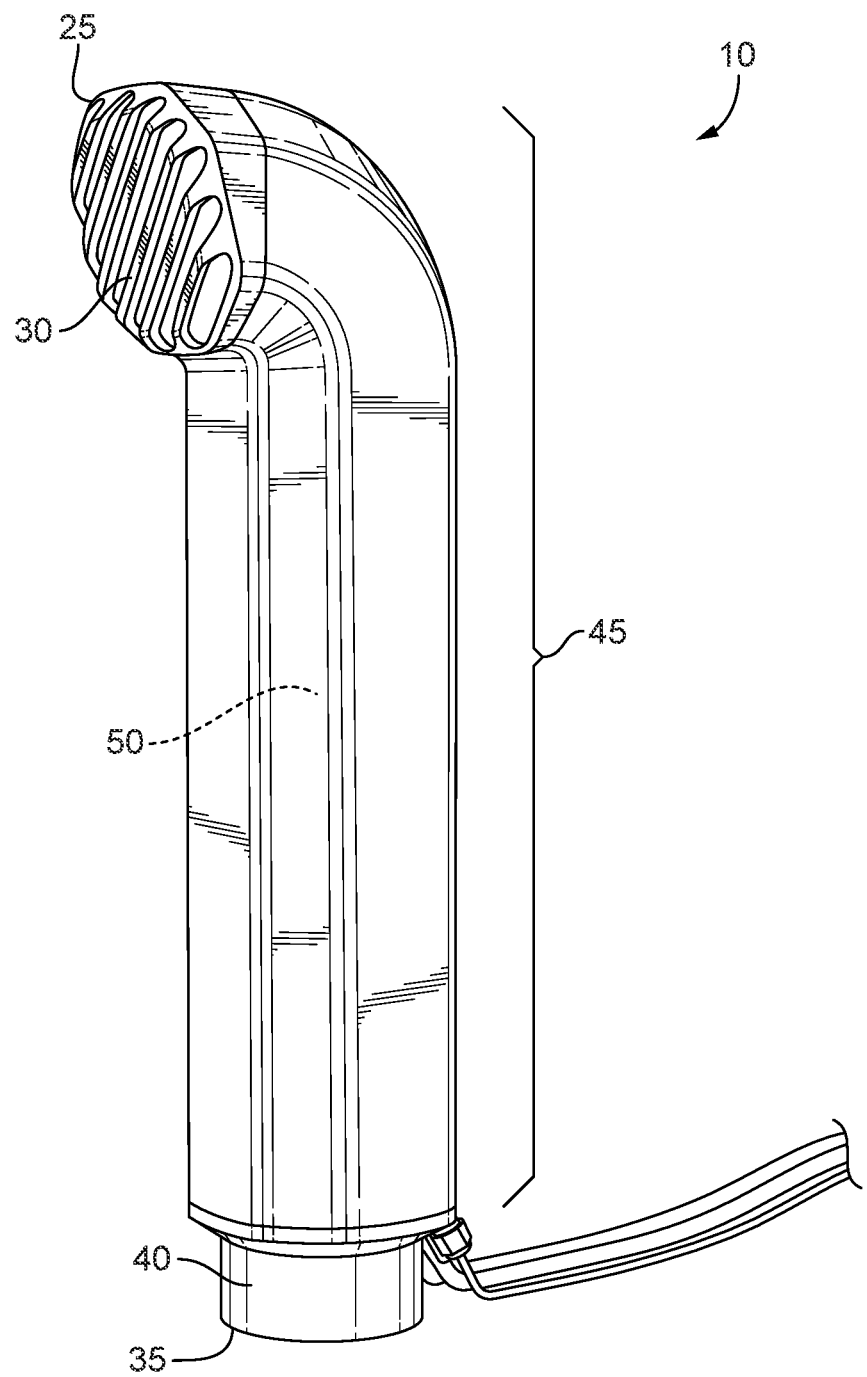
FIG. 2a is a perspective view of a system riser in accordance with some embodiments of the presently disclosed subject matter.

FIG. 2a illustrates one embodiment of riser 10 comprising first end 25 defined by entry 30 that acts as an elongated channel open to the atmosphere. Entry 30 thus provides an opening for water, air, and other fluids to enter the system interior channel. The riser further includes second open end 35 comprising joint 40 that allows connection with valve assembly 15. Neck 45 spans the distance between the first end and joint 40 of the riser. The riser is configured to include interior channel 50 that extends the entire length of the riser. The riser thus acts as a conduit having first and second open ends.

Figure 2B:
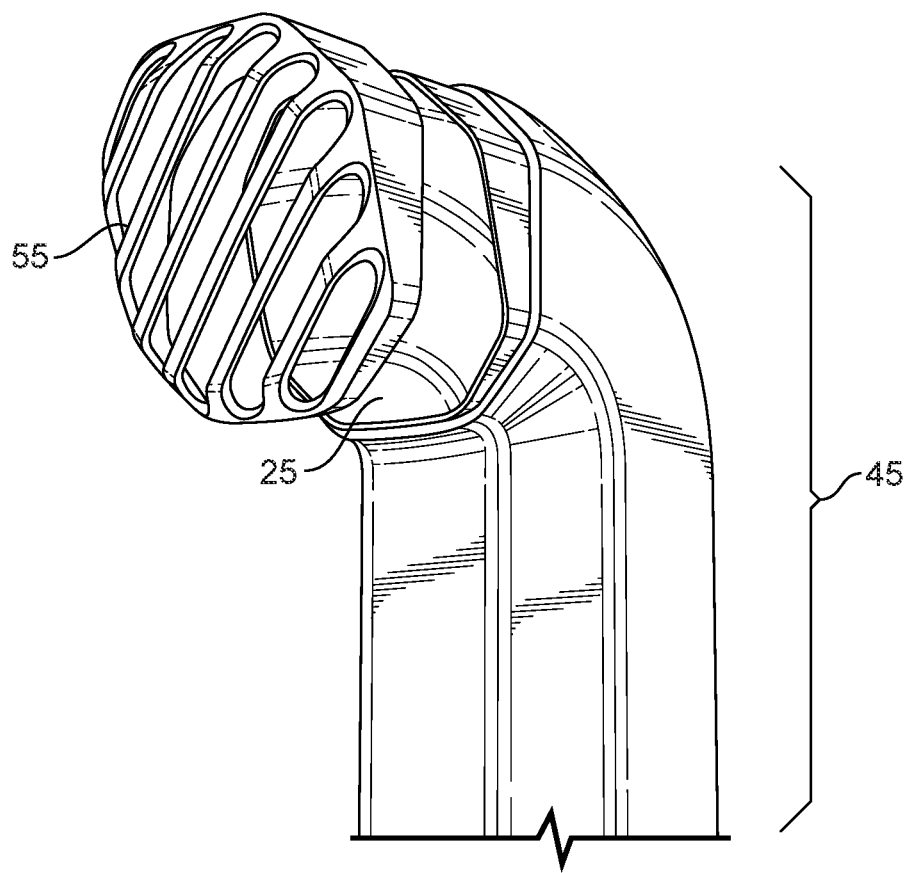
FIG. 2b is a fragmentary perspective view of a snorkel system riser first end in accordance with some embodiments of the presently disclosed subject matter.

In some embodiments, the riser first end can include covering 55, as shown in FIG. 2b. The term "covering" broadly refers to any element that at least partially restricts the fluid from flowing into entry 30. The covering can therefore prevent particulates such as sticks, dirt, leaves, and the like from entering the riser interior channel. Covering 55 can be permanently attached to riser first end 25 through the use of adhesives, welding, and the like. Alternatively, the covering can be removably attached to the riser first end, such as through snap-fit closure, pressure-fit closure, mechanical elements (e.g., fasteners, clips, bolts, snaps, magnets, and the like).

Figure 2C:
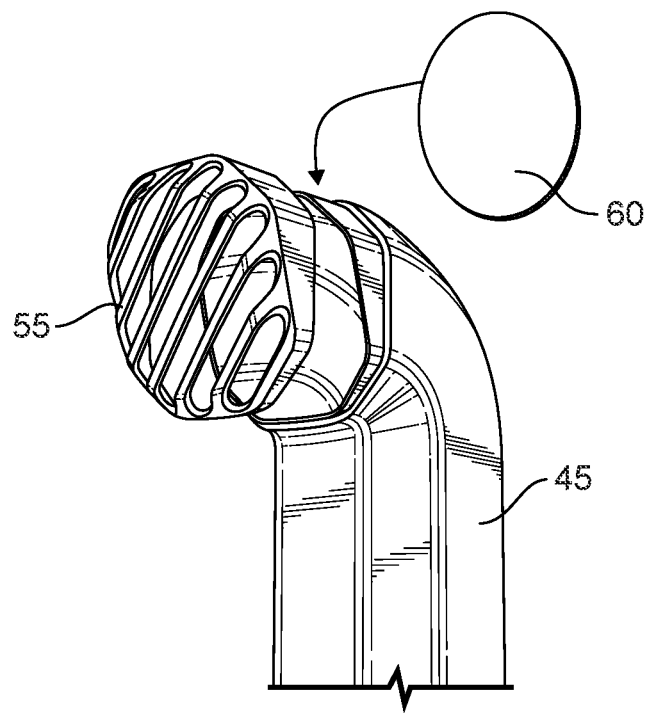
FIG. 2c is a fragmentary perspective view of a snorkel system riser first end comprising a filter in accordance with some embodiments of the presently disclosed subject matter.

In some embodiments, the riser can include filter 60 positioned between the covering and riser first end, as shown in FIG. 2c. The filter can include any element that restricts the flow of water or fluid into interior channel 50. Thus, suitable filters 60 can be constructed from mesh (e.g., hydrophobic mesh), opened celled foam, ceramic filters, fiber filters, weaved filters, and the like.

Figure 2D:
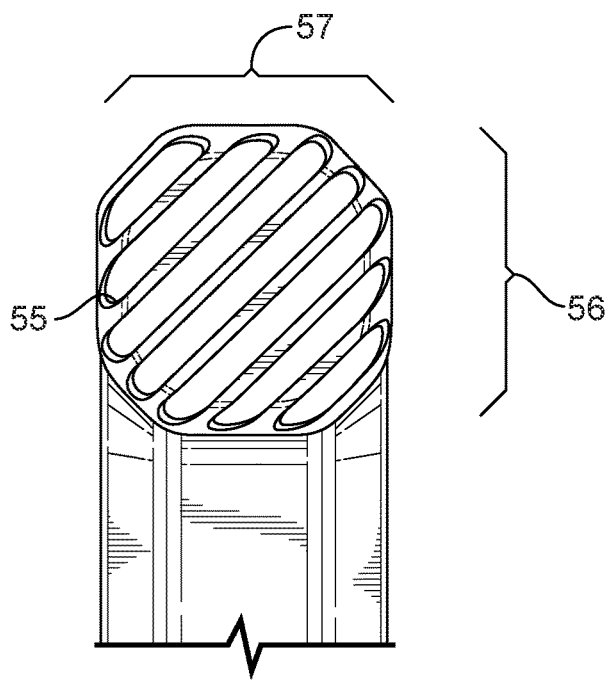
FIG. 2d is a front fragmentary view of a snorkel system riser in accordance with some embodiments of the presently disclosed subject matter.

Covering 55, entry 30, and filter 60 can be configured in any desired size. Thus, the elements can have length 56 and/or width 57 of about 2-10 inches (e.g., at least/no more than about 2, 2.5, 3, 3.5, 4, 4.5, 5, 5.5, 6, 6.5, 7, 7.5, 8, 8.5, 9, 9.5, or 10 inches). The term "length" refers to the longest vertical distance of an element. The term "width" refers to the longest horizontal distance of an element, as illustrated in FIG. 2d. However, it should be appreciated that the covering, entry, and filter are not limited and can be configured outside the given ranges.

The covering, entry, and filter can be configured with any desired cross-sectional shape, such as (but not limited to) circular, oval, square, rectangular, triangular, pentagonal, hexagonal, octagonal, and the like. In some embodiments, covering 55, entry 30, and filter 60 each have about the same cross-sectional shape. However, one or more of the covering, entry, and filter can have a cross-sectional shape that differs from at least one other element.

It should be appreciated that covering 55 and/or filter 60 are optional and riser 10 can be configured without these elements.

Figure 3A:
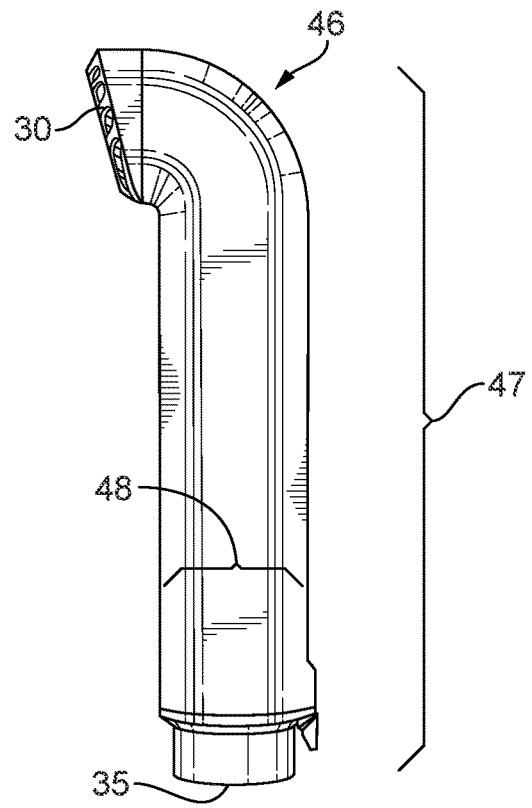
FIG. 3a is a side plan view of a snorkel system riser comprising a length and width in accordance with some embodiments of the presently disclosed subject matter.

As set forth above, riser 10 also includes neck 45 that connects the first and second ends of the riser. In some embodiments, the neck can include curved region 46 or can be configured at an angle (e.g., L-shaped), as shown in FIG. 3a. The curve of the neck can be configured such that the angle between the first and second ends of the riser is about 90 degrees. However, the angle of neck 45 is not limited and can be acute or obtuse. Further, neck is not limited and can be angled as desired by the user or to accommodate a particular ATV. For example, it may be advantageous for curved region 46 to angle slightly downwards (towards second end 35) to encourage the flow of fluid (e.g., liquid, gases) through interior channel 50.

Neck 45 can have any desired length 47, as shown in FIG. 3a. For example, the neck can have length of about 10-30 inches in some embodiments (e.g., at least/no more than about 10, 11, 12, 13, 14, 15, 16, 17, 18, 19, 20, 21, 22, 23, 24, 25, 26, 27, 28, 29, or 30 inches). Further, the neck can include width 48 of about 2-10 inches (e.g., at least/no more than about 2, 2.5, 3, 3.5, 4, 4.5, 5, 5.5, 6, 6.5, 7, 7.5, 8, 8.5, 9, 9.5, or 10 inches). However, the length and width of the neck are not limited and can be configured outside the given ranges.

The neck can have any desired cross-sectional shape, such as circular, oval, square, rectangular, triangular, pentagonal, hexagonal octagonal, and the like.

Figure 3B:
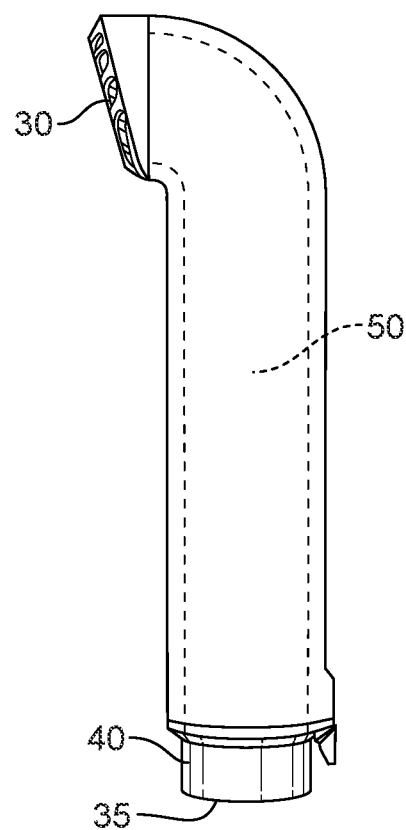
FIG. 3b is a side plan view of a snorkel system riser illustrating an interior channel in accordance with some embodiments of the presently disclosed subject matter.
Figure 3C:
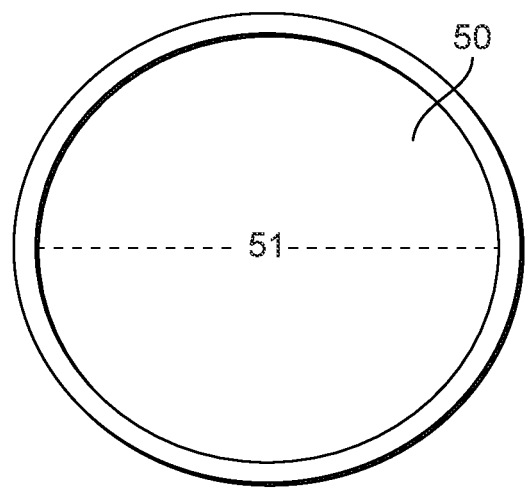
FIG. 3c is a cross-sectional view of a snorkel system riser in accordance with some embodiments of the presently disclosed subject matter.

Neck 45 includes interior channel 50 through which water and other fluids can travel, as shown in FIG. 3b. The interior channel is configured to allow water that enters the riser via entry 30 to exit the riser and travel into the interior of the valve assembly, as discussed below. Channel 50 can have any desired cross-sectional shape (e.g., circular, oval, square, rectangular, triangular, etc.). The channel can further include any diameter 51, such as about 2-10 inches (e.g., at least/no more than about 2, 2.5, 3, 3.5, 4, 4.5, 5, 5.5, 6, 6.5, 7, 7.5, 8, 8.5, 9, 9.5, or 10 inches), as shown in FIG. 3c. The term "diameter" refers to the longest straight-line distance that passes through the center of a cross-section of an element. In some embodiments, channel diameter 51 is consistent along the length of neck 45. In other embodiments, the channel diameter can vary (e.g., taper at first and/or second ends 25, 30).

Figure 4A:
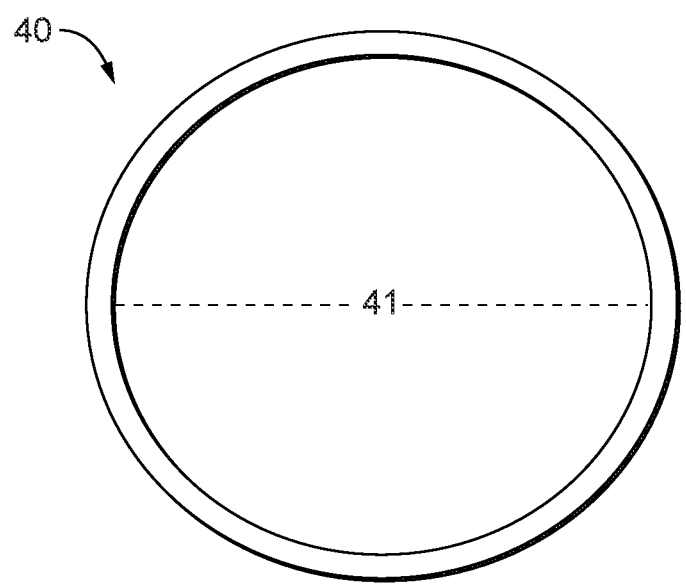
FIG. 4a is a cross-sectional view of a snorkel system valve assembly in accordance with some embodiments of the presently disclosed subject matter.
Figure 4B:
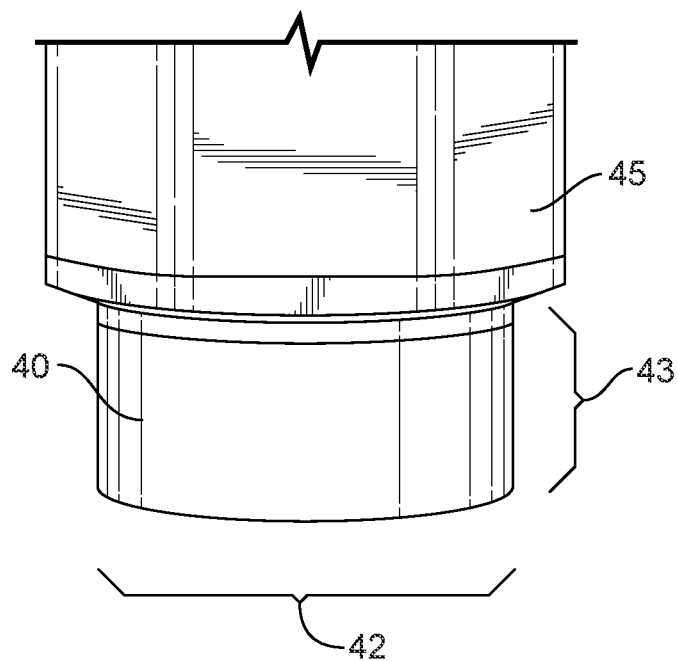
FIG. 4b is a perspective view of a snorkel system valve assembly in accordance with some embodiments of the presently disclosed subject matter.

As described above, riser 10 includes joint 40 positioned at second end 35. In some embodiments, the joint has a diameter that is less than the diameter of neck 45. For example, joint diameter 41 can be about 1-50 percent less than the diameter of the riser neck (e.g., about 1, 2, 3, 4, 5, 10, 15, 20, 25, 30, 35, 40, 45, or 50 percent less). Thus, diameter 41 can be about 2-10 inches (e.g., at least/no more than about 2, 2.5, 3, 3.5, 4, 4.5, 5, 5.5, 6, 6.5, 7, 7.5, 8, 8.5, 9, 9.5, or 10 inches), as shown in FIG. 4a. However, it should be appreciated that the joint diameter and neck diameter can be configured outside the ranges given herein.

Joint 40 can also include width 42 of about 2-10 inches (e.g., at least/no more than about 2, 2.5, 3, 3.5, 4, 4.5, 5, 5.5, 6, 6.5, 7, 7.5, 8, 8.5, 9, 9.5, or 10 inches). The joint can have length 43 of about 1-10 inches (e.g., at least/no more than about 1, 1.5, 2, 2.5, 3, 3.5, 4, 4.5, 5, 5.5, 6, 6.5, 7, 7.5, 8, 8.5, 9, 9.5, or 10 inches). However, the length and width of the joint are not limited to the ranges given herein.

Figure 5A:
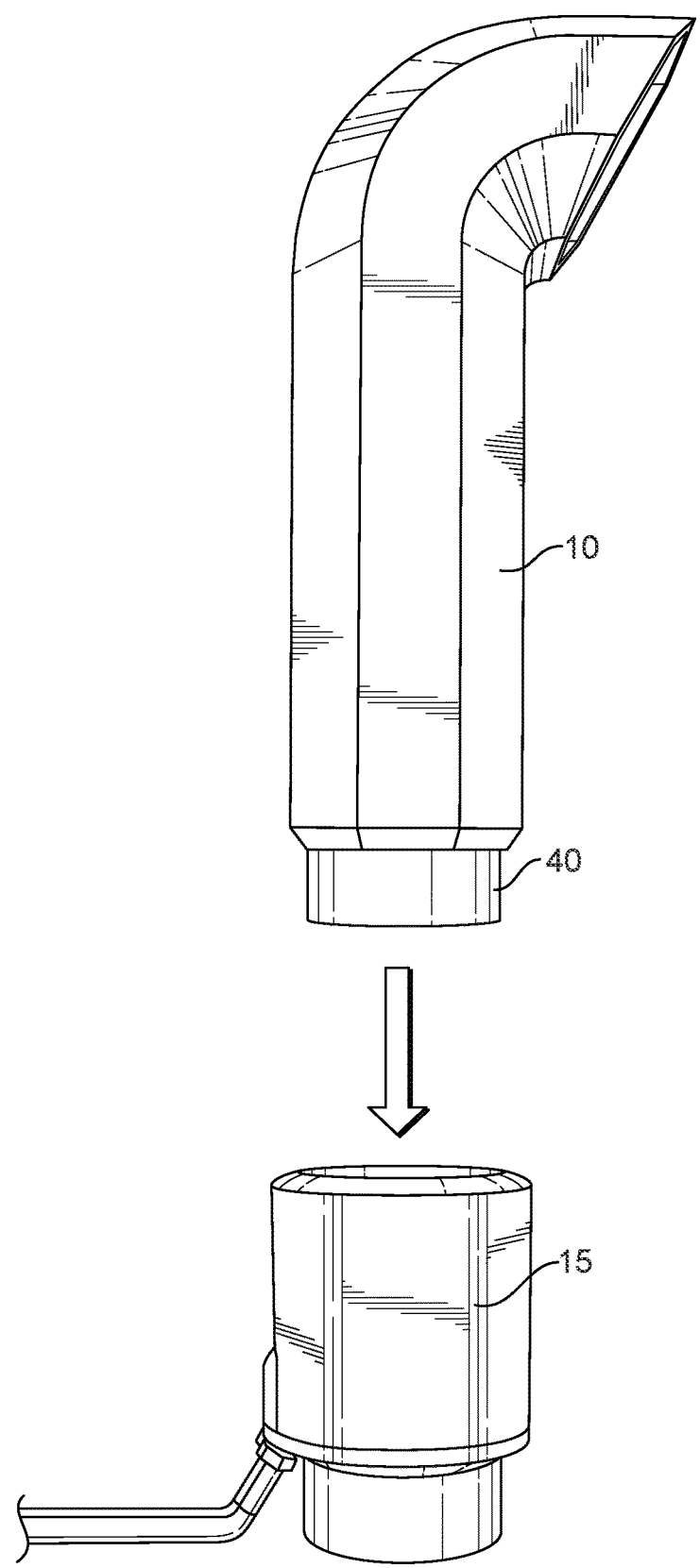
FIG. 5a is a perspective view of a snorkel system riser and valve assembly in accordance with some embodiments of the presently disclosed subject matter.

Joint 40 allows connection of the riser to valve assembly 15. Particularly, the joint can be housed within the interior of the valve assembly, as shown in FIG. 5a. In some embodiments, the riser joint is permanently attached to the valve assembly via welding, thermoforming, adhesives, and the like. In other embodiments, the riser joint is releasably attached to the valve assembly through any of a wide variety of mechanisms, such as (but not limited to) snap fit closure, pressure fit closure, screw threads, magnets, mechanical elements (e.g., clips, fasteners, bolts), and the like. In this way, a variety of risers (e.g., conventional risers) can be used.

Figure 5B:
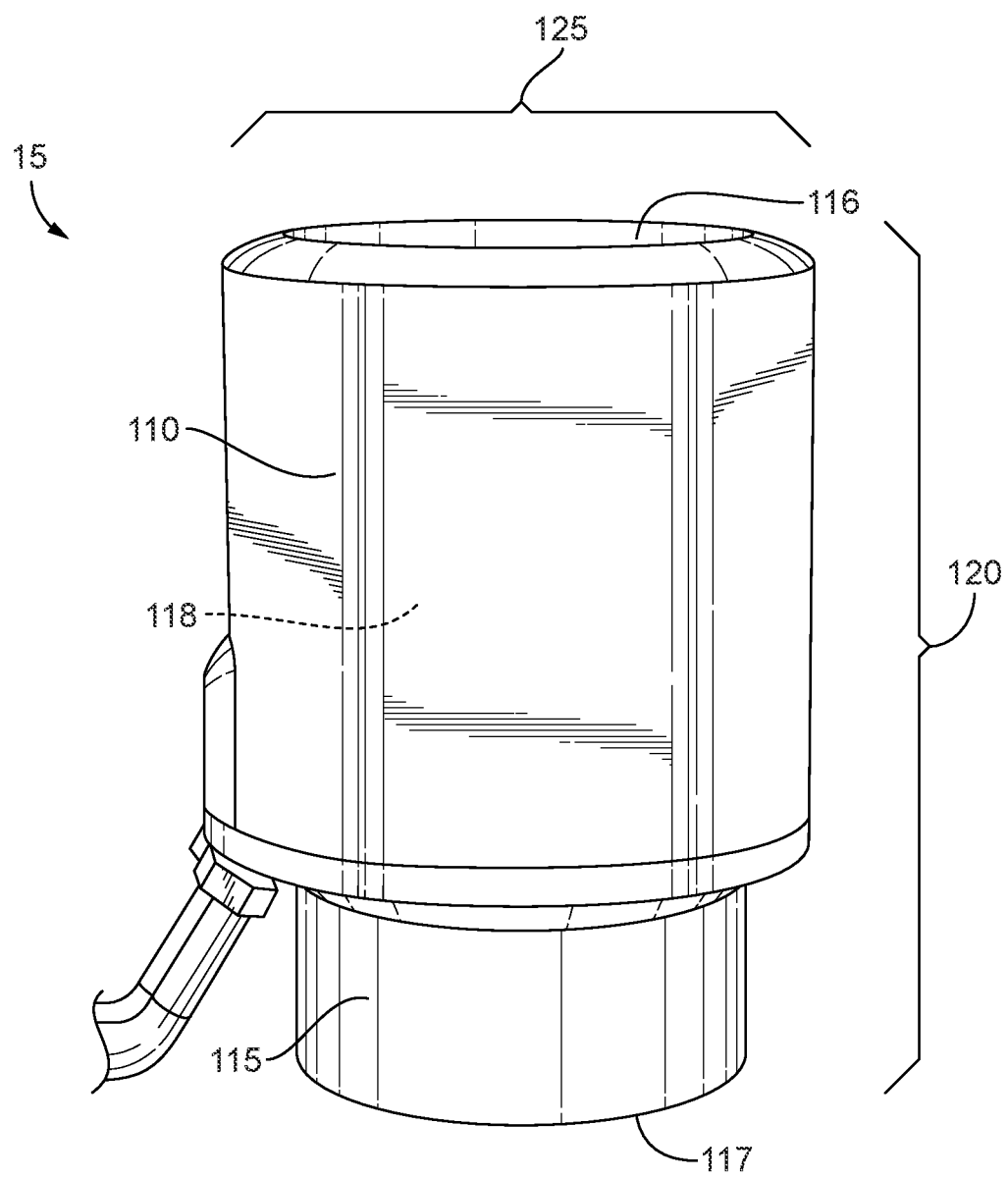
FIG. 5b is a perspective view of a snorkel system valve assembly with a length and wide in accordance with some embodiments of the presently disclosed subject matter.

Valve assembly 15 comprises main body 110 and housing 115, as shown in FIG. 5b. The valve assembly includes open first and second ends 116, 117 and interior 118. The valve assembly includes length 120 of about 2-10 inches (e.g., at least/no more than about 2, 2.5, 3, 3.5, 4, 4.5, 5, 5.5, 6, 6.5, 7, 7.5, 8, 8.5, 9, 9.5, or 10 inches). The valve assembly further includes width 125 of about 1-10 inches (e.g., at least/no more than about 1, 1.5, 2, 2.5, 3, 3.5, 4, 4.5, 5, 5.5, 6, 6.5, 7, 7.5, 8, 8.5, 9, 9.5, or 10 inches). However, length and width are not limited to the ranges given herein. In some embodiments, the housing can be about 5-50 percent smaller in length and/or width compared to the main body of the valve assembly (e.g., at least/no more than about 5, 10, 15, 20, 25, 30, 35, 40, 45, or 50 percent).

Figure 5C:
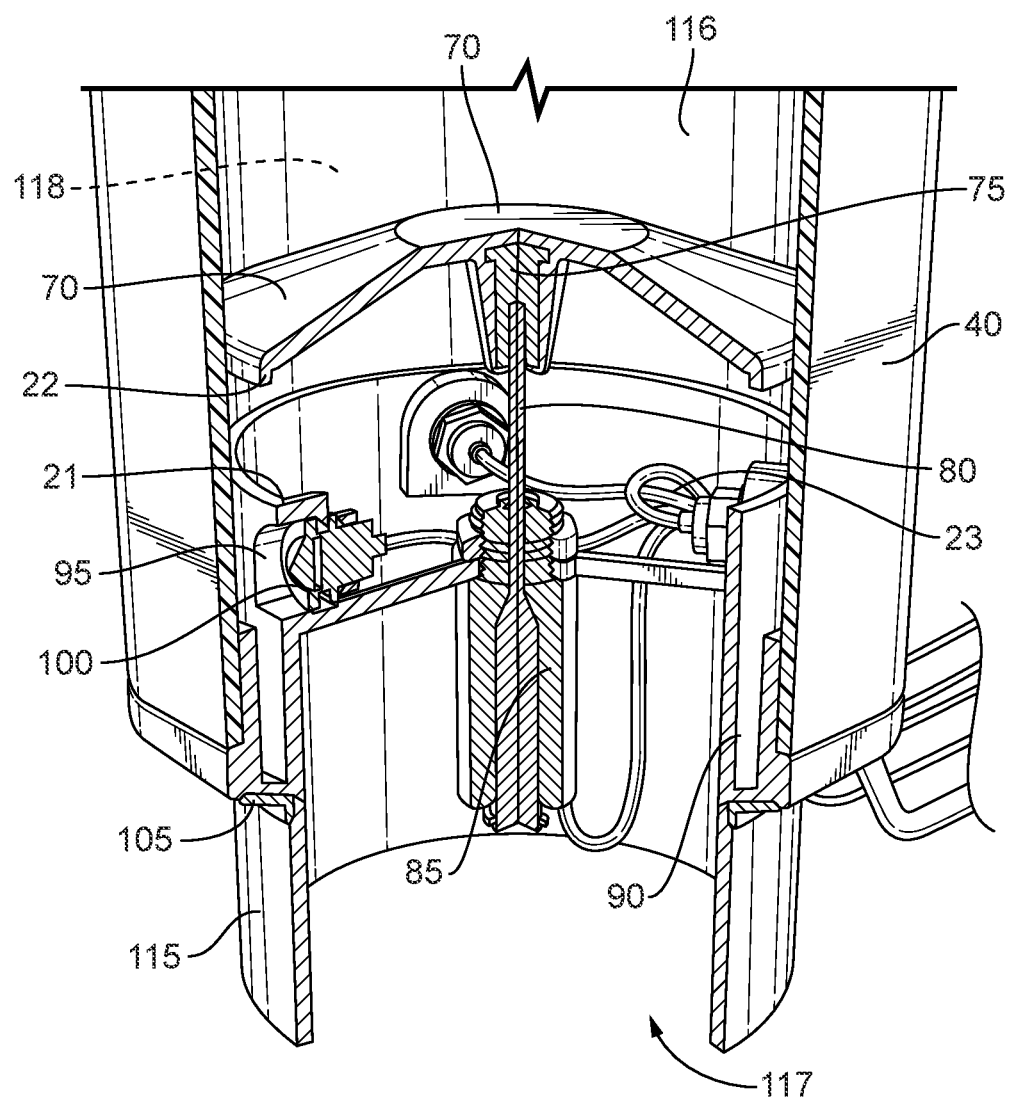
FIG. 5c is a fragmentary cutaway view of a snorkel system valve assembly in accordance with some embodiments of the presently disclosed subject matter.

The interior of the valve assembly is illustrated in FIG. 5c. Specifically, the assembly includes valve 70 that spans the circumference of the main body interior. The term "valve" as used herein refers to any element that functions to control, redirect, restrict, or stop the flow of water. In some embodiments, the valve is an umbrella valve, although any type of valve can be used. The valve assembly also includes housing 115, a water channel to drain 90, an automatic or manual drain 105, water sensor housing area 95, one or more water sensors 100, solenoid 85, solenoid shaft 80, connector 75 that joins the valve to the solenoid shaft, and valve seat 21.

In use, when water enters the riser and travels down the riser neck, it passes over the edges of the valve to contact drain 90. The drain can be configured as a deep channel that extends below sensors 100 to enable "splash ups" (e.g., small amounts of water to enter without tripping the sensor, causing false trips that shut the valve unnecessarily). The drain channels can be configured with a depth of about 0.25-5 inches in some embodiments (at least/no more than about 0.25, 0.5, 0.75, 1, 1.5, 2, 2.5, 3, 3.5, 4, 4.5, or 5 inches). However, the presently disclosed subject matter is not limited and the channel can have any suitable depth.

Each sensor 100 is configured within a corresponding aperture 95 within the housing. In some embodiments, the valve assembly can include a plurality of sensors (e.g., 1, 2, 3, 4, 5, or more). In this way, if the associated vehicle is at an angle or on a non-level surface, the presence of water can be sensed. As such, the disclosed system creates an environment with increased safeguards against water entry into a vehicle motor. The water sensors can be spaced out along the perimeter of the housing (e.g., randomly positioned, grouped together, or equidistant from adjacent water sensors).

When water fills the drain channel and contacts water sensor 100, solenoid 85 is activated by the water sensor(s) and shaft 80 moves down to pull the valve closed, creating a watertight seal. Around the lower surface of the valve, a sealing material can be included (e.g., a rubber ring, gasket, etc.). As such, the valve seal is configured to be waterproof.

Valve 70 has an external diameter that is smaller than the inside diameter of the snorkel riser (e.g., housing 110). In some embodiments, the diameter of the valve is about 0.1-50 percent smaller than the snorkel riser or housing 110 (e.g., at least/no more than about 0.1, 1, 5, 10, 15, 20, 25, 30, 35, 40, 45, or 50 percent smaller). The valve is also separated from seat 21 so that air flow is not interrupted and remains the same as if the valve were not present (and air flows directly through an open tube). The term "valve seat" refers to the area where the valve will touch to create a watertight seal. Accordingly, the vehicle motor continuously receives the correct amount of air to operate.

Lines 23 enter under the valve seat, remaining watertight when valve 70 closes. Lines 23 can be configured as vent lines for the ATV carburetor, rear differential, front differential, crankcase, gas tank, etc. connected via barbed fitting to the valved assembly housing.

The solenoid and rear of the water sensors will always remain watertight when the valve is closed. The term "watertight" or "waterproof" refers to the condition of being sealed to allow no water to pass.

Solenoid assembly 85 is held in place in the center of the assembly using one or more mounts. In this way, the solenoid remains in a fixed position and only the shaft will move to the open and close valve 70. It should be appreciated that any method of mounting the solenoid can be used, such as snap-fit assembly, fasteners, clips, hooks, magnets, screw-fit assembly, and the like.

Drain 105 can include any suitable configuration. For example, the drain can be configured as a threaded ring with a gasket that is manually operated. In some embodiments, the drain can be configured as a one-way flap that selectively allows water to exit the system, but not enter. In still other embodiments, the drain can be configured as a valve connected to power that opens when valve 70 is tripped to the closed position and closes when valve 70 is in the open position. In some embodiments, the drain can include a float collar comprising a check valve that allows circulation of fluid flow in only one direction (out of the assembly). The float collar thus prevents fluid from entering the system when the valve is closed. It should be appreciated that any other conventional drain can be used.

The term "float collar" refers to a coupling device that includes a valve (e.g., a check valve) that allows circulation of fluid in only one direction. For example, it can allow fluid to flow downwards but not in an upward direction. The primary goal of the float collar is to prevent water from entering the interior of the system through the drain. Any type of float collar can be used, such as a flapper type, spring-loaded ball valve type, etc. In some embodiments, the term "collar valve" refers to a float collar.

As shown, the valve assembly can be configured at the bottom of the riser as illustrated in FIG. 5c. However, the valve assembly can be positioned at the top portion of the riser, the middle of the riser, or anywhere along the riser neck.

The valve assembly also includes connector 75 that joins the valve to solenoid shaft 80 that cooperate with solenoid assembly 85 to open and close the valve. The term "solenoid assembly" includes any electric conductor wound as a helix with a pitch such that current through the conductor establishes a magnetic field within the conductor. When the solenoid assembly is activated (e.g., by detecting the presence of water), shaft 80 moves to close the valve. In this way, water that flows from the riser into the valve assembly cannot revert back to the riser. In lieu of a solenoid assembly, any element that functions to activate or deactivate the valve can be used.

When water is detected, the valve is activated to the closed position by the solenoid assembly. For example, the valve can be positioned into seating 21 that extends about the inner circumference of the main body interior. The seat is sized and shaped to accommodate lip 22 of the valve. The lip extends about the circumference of the valve and helps to retain the water-tight seal when the valve is in the closed position.

The disclosed system can include any number of valves, drains, vent lines, and solenoids (e.g., 1-10 or more).

The valve assembly can be constructed with any desired cross-sectional shape. For example, circular, oval, square, rectangular, triangular, pentagonal, hexagonal, octagonal, diamond, or abstract shapes can be used.

Riser 10 and valve assembly 15 can be constructed from any desired rigid or semi-rigid material. The term "rigid" refers to the characteristic of being inflexible, with a high stiffness or modulus of elasticity. The term "semi-rigid" refers to the characteristic of being substantially or partially inflexible, with a stiffness or modulus of elasticity less than a corresponding rigid material. Suitable rigid and semi-rigid materials can therefore include (but are not limited to) plastic, metal, metal alloy, wood, stone, composites, or combinations thereof.

Figure 6:
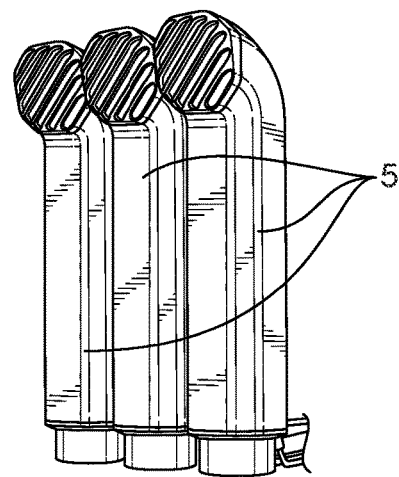
FIG. 6 is a perspective view of 3 snorkel systems in accordance with some embodiments of the presently disclosed subject matter.

It should be appreciated that the disclosed snorkel system can include any desired number of units. For example, the system can comprise 1-3 snorkels in some embodiments (e.g., 1, 2, or 3), as shown in FIG. 6. However, the presently disclosed subject matter is not limited and system 5 can include greater than 3 snorkels or a single snorkel if desired by the user. In some embodiments, each snorkel in system 5 is configured to be about the same size and/or shape. However, the presently disclosed subject matter is not limited and at least one snorkel can differ when compared to at least one other snorkel with respect to size and/or shape.

Figure 7:
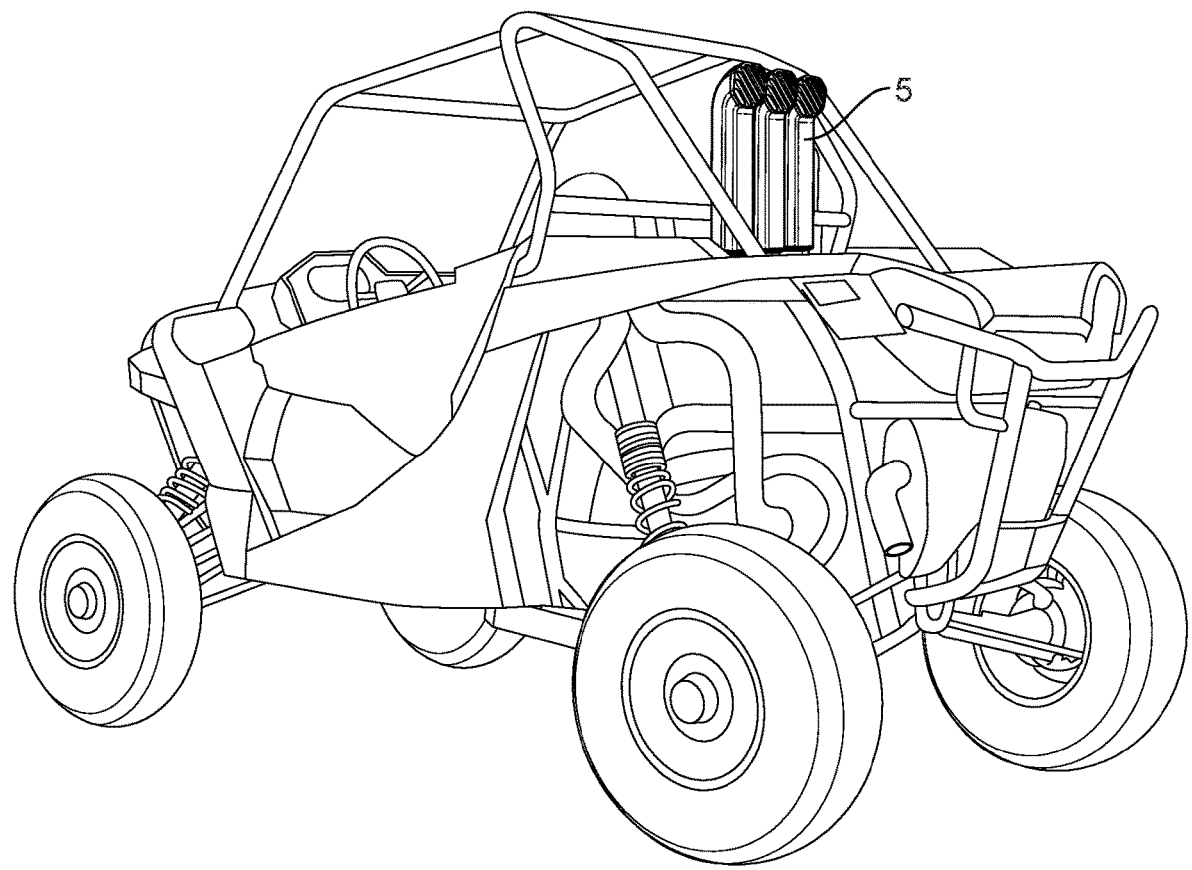
FIG. 7 is a perspective view of an ATV comprising a series of snorkel systems in accordance with some embodiments of the presently disclosed subject matter.

In use, valve assembly 15 can be mounted on an ATV (e.g., the valve housing attaches to the intake portions of an ATV motor). As shown in FIG. 7, a series of snorkel systems (e.g., three) can be attached to the ATV. The attachment can be permanent or releasable, such as through the use of screw threads, magnets, clips, fasteners, or combinations thereof. The units can be linked together in synch or on their own circuit. In some embodiments, the connection between each coupler and the ATV is water-tight to prevent the inadvertent leaking of water from the disclosed system.

During dry conditions (i.e., prior to the water sensors being triggered), the disclosed valve is in the "open" position and allows air to flow through the riser, into the first end of the valve assembly and through the second end of the valve assembly to contact the motor.

Figure 8:
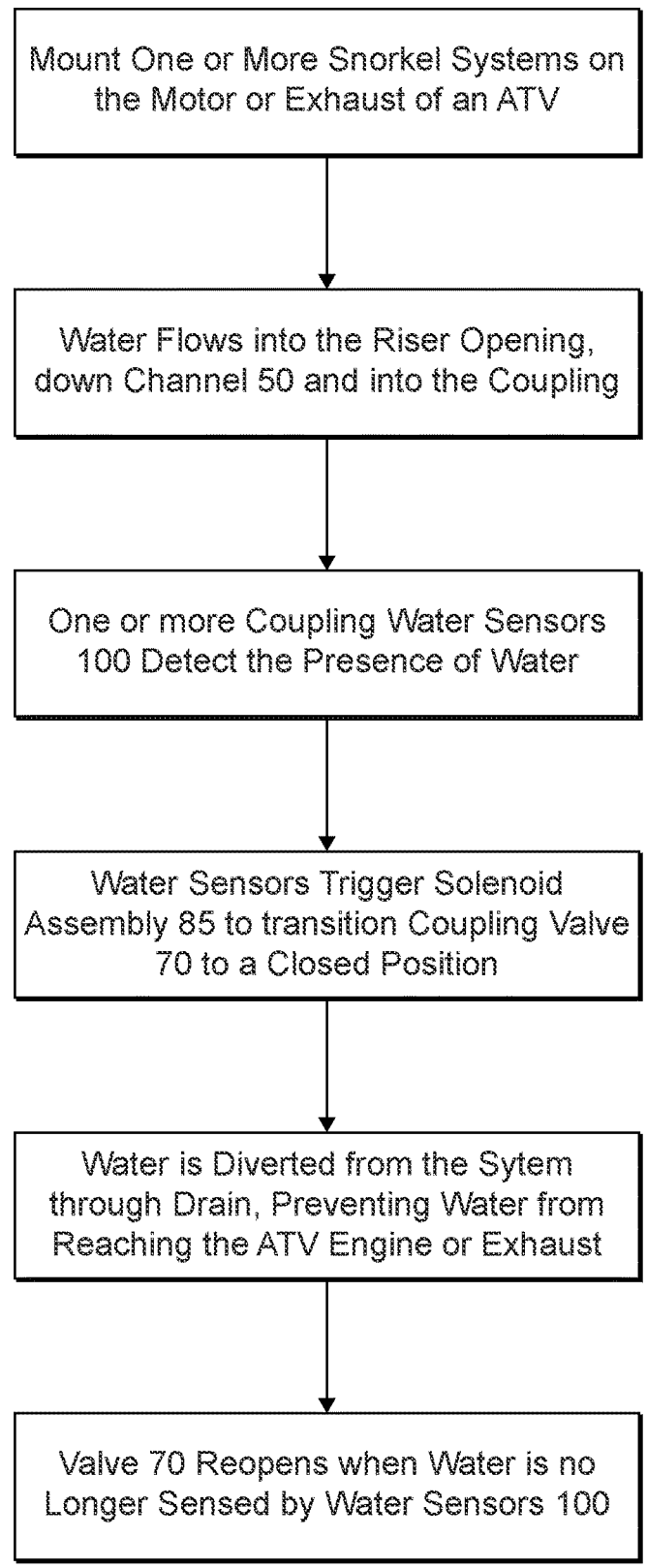
FIG. 8 is a schematic illustrating one method of using the disclosed system in accordance with some embodiments of the presently disclosed subject matter.

During wet conditions, water can flow into riser inlet 25, traveling down channel 50 to exit the riser and enter valve assembly 15. Once the water reaches a pre-determined level, water sensors 100 are triggered, activating solenoid assembly 85 to transition valve 70 to a closed position (e.g., water cannot exit second end 117 of the assembly). Instead, water is routed through drain 105. In this way, valve 70 acts as a two-way valve. The term "two-way valve" refers to a valve that includes two different fluid ports that communicate with the valve. In this case, valve 70 includes an inlet port (first end of the valve assembly) and outlet port (second end of the valve assembly). Once the valve closes, water is prevented from entering the ATV engine, transmission, air box, clutch housing, or any other vented element, as illustrated in the schematic of FIG. 8.

In some embodiments, when the water sensors are triggered and valve 70 closes, the ATV kill switch is also activated. The term "kill switch" refers to a vehicle switch that cuts the motor off. Thus, when the sensors are triggered by water, the vehicle motor will automatically turn off via the kill switch instead of the motor choking itself off. For example, if the ATV hits a water hole, the water will enter the riser and travel down into the valve assembly. The water will contact one or more water sensors 100 to close valve 70. As the valve closes, the vehicle motor will lose are and choke itself off (from lack of air). To avoid choking the engine, the disclosed system can include wiring from the valve assembly to kill switch. Thus, the kill switch is triggered to turn off the motor at the same time or about the same time that the valve closes. The kill switch essentially prevents the vehicle engine from creating a spark at the plugs (i.e., as turning of the key does). As a result, the motor is prevented from being flooded with extra fuel after it is staved for air. In addition, any type of premature engine damage resulting from the valves closing while the motor running is prevented.

The drain valve will reopen using any suitable mechanism (e.g., an automatic or manual switch) when water is no longer sensed in the valve assembly interior by the water sensors.

In some embodiments, when the vehicle motor is turned off, valve 70 automatically closes and remains closed until the motor is activated (e.g., key is returned to the on position). In this way, dust, rodents, insects, rain, and the like are prevented from entering the motor when not in use.

The disclosed system can include any of a wide variety of control mechanisms, such as a control panel with lights, switches, buttons, screens to indicate tripped or open status of the snorkels, manual or automatic reset switch, and the like.

In some embodiments, system 5 can be used on the motor exhaust portions of an ATV motor. In these embodiments, the system can be constructed from a heat-resistant material positioned adjacent to the silencer in the ATV exhaust pipe. In this way, the intake valve assembly will be directly linked. In use, the exhaust is blocked off within a timed delay of the snorkels closing to allow the exhaust pressure/gas to release before closing off the exhaust to prevent water from being sucked back into the exhaust pipe (and potentially reaching the motor). As a result, the motor will be fully protected from exposure to water.

Advantageously, the disclosed system protects an ATV motor after water reaches the crucial level of entering riser 10, preventing any water from entering the vehicle motor.

The disclosed system can be easily installed on the motor of an ATV, without requiring training or other extensive planning.

System 5 can be removably attached to the ATV, allowing versatility to the user.

The disclosed system is versatile and can be used with a wide variety of ATVs.

System 5 can provide a significant cost savings to the user, preventing or decreasing the changes of damage to the ATV motor from exposure to water.

The disclosed riser and valve assembly can be easily and quickly broken down or assembled on a vehicle.

In some embodiments, the system valve assembly can be used with the disclosed riser or any conventional riser.

The foregoing descriptions have been presented for purposes of illustration and description and are not intended to be exhaustive or to limit the presently disclosed subject matter. Those of ordinary skill in the relevant art will therefore appreciate that many different and varied modifications and variations are possible in light of the present disclosure.

What is claimed is:

1. A snorkel system for use with a vehicle, the snorkel system comprising:
   a coupling defined by:
      a main body comprising a first end and a second end with an interior channel therebetween; and
      a housing comprising a first end and a second end with an interior channel therebetween, wherein the first end of the housing is in fluid connection with the second end of the main body;
      wherein the interior channel of the main body comprises a valve defined by an inlet, an outlet, and a drain, wherein the valve is switchable between a first position in which the inlet is selectively in fluid communication with the outlet and a second position in which the inlet is selectively in fluid communication with a drain;
      wherein the interior channel of the housing comprises one or more water sensors and one or more solenoid assemblies in fluid communication with each other;
      wherein the solenoid assembly drives the valve to switch between the first position and the second position in response to the presence of water within the interior channel of the main body as detected by the water sensors.

2. The snorkel system of claim 1, wherein the snorkel further comprises a riser defined by:
   a first end, a second end, a neck positioned between the first and second ends;
   an interior channel that runs the length of the riser;
   a joint positioned at the second end of the riser, wherein the joint comprises a first end and a second end, the first joint end in fluid communication with the second end of the riser, and the second joint end configured to be in fluid communication with the first end of the coupling main body when the riser is installed on the coupling.

3. The snorkel system of claim 2, further comprising a closure, filter, or both positioned at the first end of the riser.

4. The snorkel system of claim 1, wherein the vehicle is an all-terrain vehicle.

5. The snorkel system of claim 1, wherein each water sensor is positioned within an aperture within the interior channel of the housing.

6. The snorkel system of claim 1, wherein the main body comprises a length and width that are both greater than a length and width of the housing.

7. The snorkel system of claim 1, further comprising a control unit that allows the valve to be reset to the first position.

8. The snorkel system of claim 1, wherein the valve is an umbrella valve.

9. The snorkel system of claim 1, wherein the valve is configured to switch to the second position when no water is detected by the water sensors.

10. The snorkel system of claim 1, further comprising a collar valve configured as a drain.

11. A method of diverting water through a snorkel system, the method comprising:
    positioning a valve of a snorkel system in a first position, wherein the snorkel system comprises:
        a main body comprising a first end and a second end with an interior channel therebetween; and
        a housing comprising a first end and a second end with an interior channel therebetween, wherein the first end of the housing is in fluid connection with the second end of the main body;
    wherein the interior channel of the main body comprises a valve defined by an inlet, an outlet, and a drain, wherein the valve is switchable between a first position in which the inlet is selectively in fluid communication with the outlet and a second position in which the inlet is selectively in fluid communication with a drain;
    wherein the interior channel of the housing comprises one or more water sensors and one or more solenoid assemblies in fluid communication with each other;
    wherein the solenoid assembly drives the valve to switch between the first position and the second position in response to the presence of water within the interior channel of the main body as detected by the water sensors;
    receiving water in the interior channel of the main body, whereby the water activates the one or more water sensors, triggering the solenoid assembly to move the valve to the second position;
    channeling the water from the coupling, thereby diverting water from the system through a drain.

12. The method of claim 11, wherein the second end of the housing is operably connected to a vehicle motor, vehicle exhaust, or both.

13. The method of claim 12, wherein the vehicle is an all-terrain vehicle.

14. The method of claim 11, wherein the solenoid assembly controls each valve simultaneously.

15. The method of claim 11, wherein the system further comprises a control unit that allows the valve to be reset to the first position.

16. The method of claim 11, wherein the valve switches to the second position when no water is detected by the water sensors.

17. The method of claim 11, wherein three systems are operably connected to a vehicle motor, vehicle exhaust, or both.

18. The method of claim 11, wherein the system comprises a collar valve configured as a drain.

* * * * *